(12) United States Patent
Holberg et al.

(10) Patent No.: US 10,533,095 B2
(45) Date of Patent: Jan. 14, 2020

(54) COATING COMPOSITION, METHOD FOR MAKING THE COATING AND USE THEREOF

(71) Applicant: Teknologisk Institut, Taastrup (DK)

(72) Inventors: Stefan Holberg, Aarhus C (DK); Claus Bischoff, Skødstrup (DK)

(73) Assignee: Teknologisk Institut, Taastrup (DK)

( * ) Notice: Subject to any disclaimer, the term of this patent is extended or adjusted under 35 U.S.C. 154(b) by 0 days.

(21) Appl. No.: 15/305,666

(22) PCT Filed: Apr. 22, 2015

(86) PCT No.: PCT/DK2015/050101
§ 371 (c)(1),
(2) Date: Oct. 21, 2016

(87) PCT Pub. No.: WO2015/161857
PCT Pub. Date: Oct. 29, 2015

(65) Prior Publication Data
US 2017/0044380 A1    Feb. 16, 2017

(30) Foreign Application Priority Data
Apr. 25, 2014   (DK) .................................. 2014 70243

(51) Int. Cl.
| | |
|---|---|
| *C09D 5/08* | (2006.01) |
| *C09D 183/06* | (2006.01) |
| *C09D 183/10* | (2006.01) |
| *C08G 18/61* | (2006.01) |

(Continued)

(52) U.S. Cl.
CPC ............ *C09D 5/086* (2013.01); *C08G 18/003* (2013.01); *C08G 18/222* (2013.01); *C08G 18/61* (2013.01);

(Continued)

(58) Field of Classification Search
CPC .. C08G 18/003; C08G 18/61; C08G 18/6225; C08G 18/8077; C08G 18/222;
(Continued)

(56) References Cited

U.S. PATENT DOCUMENTS

| | | | |
|---|---|---|---|
| 4,276,405 A | * | 6/1981 | Koleske ............... C08G 18/003 523/400 |
| 4,847,319 A | | 7/1989 | Bandlish |

(Continued)

FOREIGN PATENT DOCUMENTS

| | | |
|---|---|---|
| DE | 10115747 A1 | 11/2002 |
| DE | 10152853 A1 | 5/2003 |

(Continued)

OTHER PUBLICATIONS

Nagel, Carsten et al.; "New Silicone Structures"; European Coatings Journal (32), Jan. 1, 2010, pp. 32-39.

*Primary Examiner* — David T Karst
(74) *Attorney, Agent, or Firm* — James Creighton Wray

(57) ABSTRACT

A curable coating composition and the use, especially in heat exchangers, for heating and/or cooling water, in particular tap water, is described. The curable coating comprises, based on solids after curing, 35-80% by weight of an epoxysilane according to the general structure 1 and/or its hydrolysation and/or condensation products, 1: $R^1R^2_aSiR^3_b$, with R1 being 3-glycidyloxypropyl, $R^2$ being methyl, $R^3$ being alkyloxy or acyloxy, a being 0, 1 or 2 and b being 3−a and 20-65% by weight of a blocked polyisocyanate and optionally further components. The coating provides improved corrosion protection on aluminium surfaces, reduces limescale formation on heat exchanger surfaces and is able to withstand lateral and/or temporal temperature gradients when coated on heat exchanging surfaces.

7 Claims, 5 Drawing Sheets

(51) Int. Cl.
*C08G 18/62* (2006.01)
*C08G 18/80* (2006.01)
*C08G 18/02* (2006.01)
*C08G 18/22* (2006.01)
*C09D 175/04* (2006.01)
*C09D 5/16* (2006.01)
*C09D 163/00* (2006.01)
*C08K 3/24* (2006.01)
*C09D 175/00* (2006.01)
*C08G 77/14* (2006.01)
*C08G 18/00* (2006.01)
*C08G 77/442* (2006.01)

(52) U.S. Cl.
CPC ..... *C08G 18/6225* (2013.01); *C08G 18/8077* (2013.01); *C09D 5/08* (2013.01); *C09D 5/1675* (2013.01); *C09D 163/00* (2013.01); *C09D 175/04* (2013.01); *C09D 183/06* (2013.01); *C09D 183/10* (2013.01); *C08G 77/14* (2013.01); *C08G 77/442* (2013.01); *C08G 2150/90* (2013.01); *C08K 3/24* (2013.01); *C09D 175/00* (2013.01)

(58) Field of Classification Search
CPC .. C08G 77/14; C08G 77/442; C08G 2150/90; C09D 5/086; C09D 5/08; C09D 183/06; C09D 183/10; C09D 175/04; C09D 5/1675; C09D 163/00; C09D 175/00; C08K 3/24

USPC ....................................................... 523/435
See application file for complete search history.

(56) References Cited

U.S. PATENT DOCUMENTS

| | | | |
|---|---|---|---|
| 5,247,004 | A | 9/1993 | Swisher |
| 6,403,164 | B1 | 6/2002 | Jonschker |
| 7,776,148 | B2 | 8/2010 | Wagner |
| 2003/0138642 | A1 | 7/2003 | Kohler |
| 2006/0159923 | A1 | 7/2006 | Becker-Willinger |
| 2006/0167190 | A1 | 7/2006 | Trabesinger |
| 2011/0021754 | A1 | 1/2011 | Li |
| 2012/0189949 | A1* | 7/2012 | Wu ............... G03G 5/0614 430/58.75 |

FOREIGN PATENT DOCUMENTS

| | | |
|---|---|---|
| DE | 10315944 A1 | 10/2004 |
| EP | 1129789 A1 | 9/2001 |
| EP | 1624274 A1 | 2/2006 |
| EP | 1661873 A1 | 5/2006 |
| JP | 2008202133 A | 9/2008 |
| WO | 0157105 A1 | 8/2001 |
| WO | 0157106 A1 | 8/2001 |
| WO | 2012018296 A1 | 2/2012 |
| WO | 2012083970 A1 | 6/2012 |

* cited by examiner

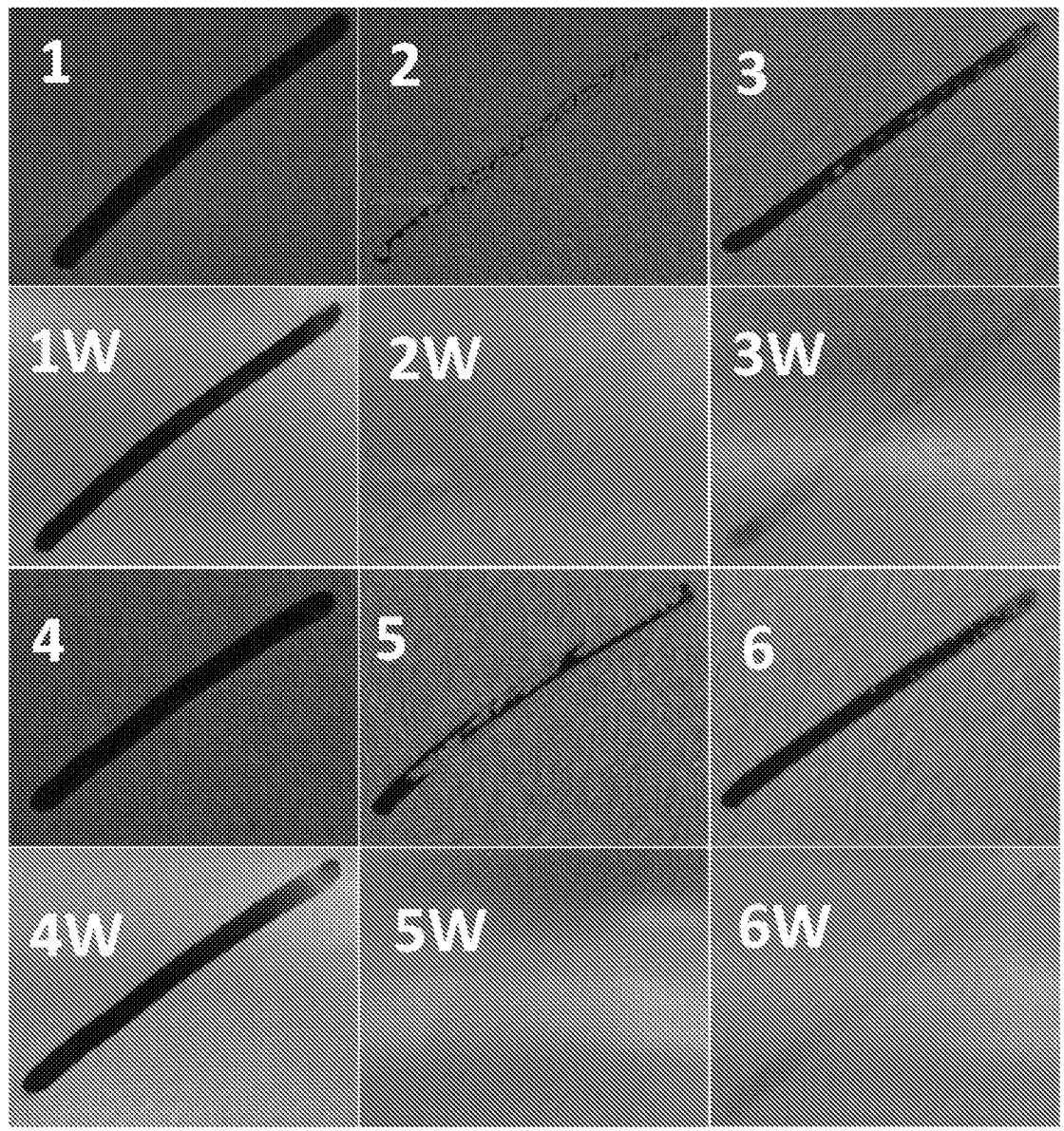
Figs. 5.1-5.6

COATING COMPOSITION, METHOD FOR MAKING THE COATING AND USE THEREOF

This application claims the benefit of Danish Application No. PA 2014 70243 filed Apr. 25, 2014, and PCT/DK2015/050101 filed Apr. 22, 2015, International Publication No. WO 2015/161857 A1, which are hereby incorporated by reference in their entirety as if fully set forth herein.

FIELD OF THE INVENTION

The present invention relates to a coating composition and to the use of a coating film prepared from the coating composition on heat transfer surfaces.

BACKGROUND OF THE INVENTION

Various technical devices are made of metals. These metal surfaces can be affected by corrosion or scaling, both impairing the function of the respective device.

A specific problem is limescale, which occurs especially when hard ground water is warmed up, for example in heat exchangers to supply households and companies with warm water. The limescale reduces the heat transfer through the heat exchanger surface and restricts the flow. After a certain time of use, costly cleaning or even replacement of the heat exchanger is necessary. Various types of heat exchangers and various heat sources, such as district heating, oil or gas burners are used. Plate heat exchangers are an efficient solution to transfer heat from district heating to households. Due to the compactness of these heat exchangers, there can be a significant lateral temperature gradient along the plates. Furthermore, the control mode of these heat exchangers, especially when they directly, without a further reservoir, provide warm water to the somewhat irregular demand of the end users, may lead to frequent and sudden temperature changes.

Repellent coatings have been proposed to avoid or reduce scaling. EP 1129789 B1 teaches the application of silane fluorinated resins to form few μm thick coating films that reduce the adhesion of limestone on heat exchangers used to warm up water. However, the coating has only been tested on test panels and on a camp stove. No data on test duration is disclosed. Thus, no data on long-term stability of the coating against temperature changes and temperature gradients is available. Furthermore, the use of fluorinated resins is, from an environmental point of view, not optimal.

WO 2012083970 A1 teaches a repellent coating against scaling based on silanes and a polydimethyl-siloxane additive. Good adhesion to stainless steel and the application of the coating on a heat exchanger is disclosed, but no data on stability against temperature changes is reported, neither any data on stability against strong lateral temperature gradients. An example of a plate heat exchanger with a length of 1.8 m and a temperature difference between inlet and outlet of 10° C. is disclosed, but the fluid used is oil and not water, and the document does not disclose any limescale repellent or reducing properties.

The distance between inlet and outlet is not disclosed, but for a commercial heat exchanger of the described type and size, it is typically in the range of 1.2 to 1.3 m. That would lead to a lateral temperature gradient of ~0.008° C./mm DE 10152853 A1 teaches a coating based on epoxysilanes and blocked isocyanates that can be used as easy-to-clean coating for metal surfaces. No data about stability against temperature changes or temperature gradients is disclosed, and the document does not disclose any limescale repellent or reducing properties.

WO 2012018296 A1 discloses a plate heat exchanger with anti-fouling properties with a low-energy surface comprising silicone oxide, prepared, for example, from a silanterminated polymer or a polysiloxan-urethan resin applied to metal surfaces as, for example, copper or stainless steel. No data about temperature gradients is disclosed. The coating withstands a sudden temperature change by dipping into liquid nitrogen at −196° C. and contact with crude oil, but does on the other hand deteriorate in contact with sea water. No data on temperature gradients is provided. The document does not disclose any limescale repellent or reducing properties.

Thus, there is a need in the art of heat exchangers to provide a surface that effectively reduces limestone scaling, but at the same time is stable towards warm water, temperature changes and temperature gradients and thus is able to operate over longer times under alternating conditions. Even though, according to DE 10152853 A1, coatings based on organically modified, crosslinked polysiloxanes firmly bond to metals like steel and are mechanically and chemically resistant, it has been found, that this does not mean that those coatings in general withstand the conditions present in heat exchangers used to supply end users with warm water.

Another specific problem is the corrosion of Aluminium. Aluminium is technically interesting due to its low specific density and low price compared to other metals. Clear polysiloxane coating films based on organosilanes with a thickness of only a few μm can effectively protect Aluminium from corrosion. The low film thickness makes it easy to stay within construction limits for dimensional stability. Furthermore, the coatings are hardly visible which is advantageous for decorative articles that should keep their metallic look and feel. Various silane-based coating compositions have been proposed, cf. U.S. Pat. No. 6,403,164 B1, WO 2012083970 A1 or DE 10152853 A1. However, any improvement in corrosion protection is of commercial interest as it extends the application area.

Object of the Invention

The object of the invention is to provide a coating which can resist temperature fluctuation and temperature gradients, when applied to surfaces which are in contact with water and operate under alternating temperature and/or pressure conditions and which provides a limescale repellent surface.

It is also an object of the present invention to provide a coating, which provides corrosion protection for Aluminium.

It is also an object to use the coating in heat exchangers used to warm tap water, in particular plate heat exchangers, which may in particular be brazed heat exchangers.

DESCRIPTION OF THE INVENTION

The present invention relates to a curable coating composition comprising 35-80% by weight (based on solids in the coating after curing) of an epoxysilane according to the general structure 1 and/or its hydrolysation and/or condensation products, 20-65% by weight (based on solids after curing) of a blocked polyisocyanate and optionally further components.

  Structure 1:

with $R^1$ being 3-glycidyloxypropyl, $R^2$ being methyl, $R^3$ being a hydrolysable group, being alkyloxy or acyloxy, a being 0, 1 or 2 and b being 3−a, the coating further comprises, based on solids after curing, 0.1 to 4% by weight of an OH-functional silicone modified polyacrylate, said silicone used to modify the polyacrylate being polydimethylsiloxane, said OH-function leading to an OH-equivalent weight of said polyacrylate of 500-5000 g/mol.

Furthermore, the present invention relates to the use of a coating on a heat-releasing surface according to any of the claims 4-6, such as a plate heat exchanger, in particular a brazed plate heat exchanger.

DESCRIPTION OF THE DRAWING

FIG. 2 shows the uncoated heat exchanger A covered with a continuous layer of limestone and limestone particles. FIG. 3 shows heat exchanger B coated with the coating according to example 2 and significantly reduced limestone scaling. FIG. 4 shows heat exchanger C coated with the coating according to example 3. It is seen on FIG. 4 that at least parts of the coating have fallen off.

FIG. 5 illustrates the results of the marker test. The numbers from 1 to 6 comply with the example numbers according to which the coating was prepared. A single number indicates the picture shows the initial marker line. A "W" after the number indicates, the picture shows the marker line after it was tried to wipe the line away with a dry tissue.

DETAILED DESCRIPTION OF THE INVENTION

Figure 1:
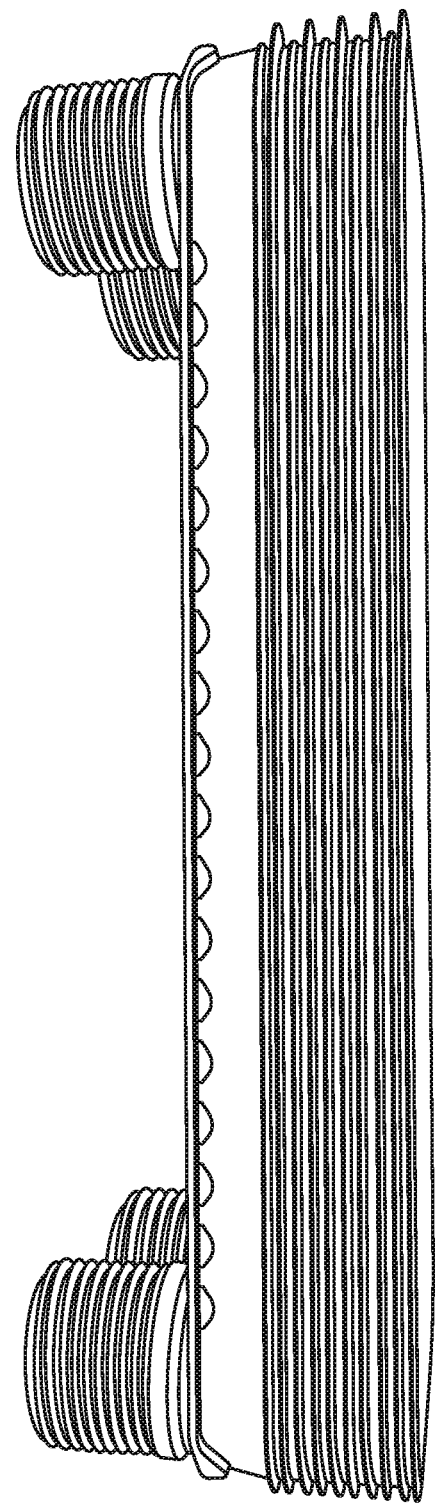
FIG. 1 shows the brazed plate heat exchanger used for the heat exchanger scaling test.

In this description, a curable coating composition is the composition of a material that can be applied to at least part of a surface. After application, the coating cures. That means, volatile components evaporate and/or reactive components chemically cross-link, optionally also with the surface underneath the coating. The coating composition's solids after curing are calculated taking also into account the evaporation of volatile components that are set free during curing, such as hydrolysable groups, water in case of condensation reactions and blocking agents.

According to the invention, at least one objective is achieved by a coating composition as described, a coating composition prepared by a method or process as described.

A curable coating composition comprising 35-80% by weight (based on solids after curing) of an epoxysilane according to the general structure 1 and/or its hydrolysation and/or condensation products, 20-65% by weight (also based on solids after curing) of a blocked polyisocyanate and optionally further components.

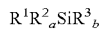   Structure 1:

with $R^1$ being 3-glycidyloxypropyl, $R^2$ being methyl, $R^3$ being a hydrolysable group, being alkyloxy or acyloxy, a being 0, 1 or 2 and b being 3−a.

Said epoxysilanes are economical commercial products. They can form dense networks during curing. They can cross-link with other silanes by hydrolysis and condensation of hydrolysable groups such as silicon bound alkoxy or acyloxy groups. The crosslinking can be induced by water from atmospheric moisture. Alternatively, water can be added to the coating composition prior to application. In a preferred embodiment, said epoxysilanes bear hydrolysable methoxy and ethoxy groups and are, prior to application, due to the addition of water, partly hydrolysed and partly condensed. In this state, the coating composition cross-links more effectively during curing.

Said epoxysilanes can also cross-link via the epoxy group with groups that react with epoxy groups such as, for example amines, acids, isocyanates or further epoxy groups. Said blocked polyisocyanates are reversibly blocked by a blocking agent, preventing unwanted reactions, for example with alcohols set free during hydrolysis of a silane. At elevated temperatures, the blocking agent is set free and common cross-linking reactions of isocyanates, such as the addition of alcohols or epoxides or reactions with water to result amines that react with further isocyanates to form ureas take place. Suitable blocked polyisocyanates are those described in detail in U.S. Pat. No. 7,776,148 B2 from column 7, line 1 to column 9, line 26 as suitable blocked polyisocyanates for the invention according to U.S. Pat. No. 7,776,148 B2, which are also suitable blocked polyisocyanates in the coating according to the present invention and which are hereby included herein by reference.

Said intervals, based on solids after curing, of 35-80% for the epoxysilane and 20-65% of the blocked polyisocyanate, are expected to lead to a good compromise of dense cross-linking by the epoxysilane and hydrolysis resistance provided by the isocyanate. In a preferred embodiment, leading to an optimised compromise, the ratio of blocked isocyanate to epoxysilane, based on solids after curing, is between 0.4 to 1 and 0.6 to 1.

In certain embodiments, further components will be added to the coating composition. The skilled person will be able to select suitable components that support the aim of the present invention. These can be, but are not limited to: Solvents to dilute the coating resin, catalysts, for example for the curing of the isocyanate functions, the epoxy functions or the siloxane network, surface active additive to provide a surface with a low surface energy and/or to improve the levelling of the coating, UV-absorbers, radical scavengers, fillers such as, for example inorganic particles to improve the mechanical properties or the corrosion resistance, pigments, dyes, adhesion promoters, further silanes or coating resins.

In a preferred embodiment, these further components are solvents, water to hydrolyse the silanes, an acid to catalyse the silane hydrolysis, a catalyst for the curing of the isocyanate group and an additive to provide a surface with a low surface energy. In a further preferred embodiment, said catalyst to catalyse curing of isocyanates is a complex of tin or zinc and said additive to provide a low surface energy contains polydimethylsiloxane. In another preferred embodiment, these further components do not contribute more than 5% to the solids after curing, thus that the coating matrix mainly consists of the optimised network formed by the epoxysilane and the polyisocyanate. According to an embodiment of the invention, it is distinctive that the coating composition comprises, based on solids after curing, 0.1 to 4% by weight (based on solids after curing) of an OH-functional silicone modified polyacrylate, said silicone used to modify the polyacrylate being polydimethylsiloxane, said OH-function leading to an OH-equivalent weight of said polyacrylate of 500-5000 g/mol. Said polyacrylate surprisingly improves the corrosion protective effect of the coating. Added in said amount of 0.1 to 4% based on solids after curing, the component provides the corrosion protective effect, but does not interfere with the other components of the coating matrix. In a preferred embodiment, an optimal effect is achieved by using 0.2 to 2% by weight (based on solids after curing) of said polyacrylate. Thus the component provides corrosion resistance to metals, such as copper or copper alloys, in particular brass, aluminium or aluminium alloys, iron or iron alloys, such as steel, in particular stainless steel, or nickel or nickel alloys and in particular to aluminium or aluminium alloys, while not reducing the above mentioned other advantageous effects of the coating. Said OH equivalent weight of 500-5000 g/mol is expected to be low enough for the polyacrylate to effectively cross-link with the polyisocyanate, but high enough not to provide undesired hydrophilicity due to polar OH groups and also high enough not to favour polar or hydrogen bridge inter actions of the additive with the metal surface over interactions of the other coating components such as, for example, the epoxysilane, with the metal surface. In a preferred embodiment for an optimal effect, said OH equivalent weight is between 900 and 3000 g/mol. The structure of OH-functional silicone modified polyacrylate is known to those skilled in the art and illustrated, for example, by C. Nagel et al., European Coatings Journal 2010 (04), p. 32-39. These polymers consist of a polymer chain obtained by polymerizing primarily acrylic acid esters and/or acrylic acid. However, the chain may comprise minor amounts of other monomers such as, for example, styrene or esters of methacrylic acid. Via the ester function, the polyacrylate bears side chains with OH-functionality and side chains with polydimethylsiloxane functionality. The polydimethylsiloxane forms dangling side chains, connected to the polyacrylate backbone only on one side of the poldimethysiloxane chain. In a preferred embodiment, the polyacrylate is virtually free of carboxylic acid groups as these are expected to provide undesired hydrophilicity.

According to another embodiment, the cured coating film prepared from the coating composition initially comprises a receding water contact angle of 70° or higher. The receding water contact angle is used here as an indirect way to characterize the polydimethysiloxane content of the OH-functional silicone modified polyacrylate. The surprising anti-corrosive effect occurs when applying such silicone modified polyacrylate, that provides sufficient polydimethylsiloxane to also provide the expected effect of the coating providing a low surface tension, thus resulting in a hydrophobic, repellent surface. The different modes of action of polyacrylates with different silicone content are outlined in C. Nagel et al., European Coatings Journal 2010 (04), p. 32-39. In the cited publication, Additive 1 in FIG. 4 describes the mode of action that, in this embodiment, is used to indirectly guarantee a sufficient polydimethylsiloxane content. The skilled person knows how to use water contact angle measurements to determine surface energies. An inhomogeneous surface with hydrophobic spots in a less hydrophobic environment would result in a high contact angle hysteresis due to a high advancing, but a low receding contact angle. Therefore, solely a high receding contact angle of at least 70° guarantees, that the amount of polydimethylsiloxane is sufficient to cover practically the complete surface. According to this embodiment, the receding static contact angle is determined initially, that means after curing, but prior to any usage that may impair the surface and thus reduce the contact angle.

According to another embodiment, the coating composition further comprises, based on solids after curing, 0.1 to 4% by weight of a metal complex with at least two ligands of the group of carboxylic acids and 1.3-dicarbonyl compounds. Such complex can catalyse isocyanate reactions. The skilled person knows a wide variety of suitable catalyst-complexes based on different metals; many of them are commercially available. It is expected, that said amount is necessary to have a sufficient effect on curing but not too high to have a negative effect on the thermal stability of the coating matrix. In a preferred embodiment, an optimal effect of said metal complex is achieved when applied in 0.2 to 2% by weight based on solids after curing. In another preferred embodiment, said complex is a complex of tin or zinc, and in a further preferred embodiment, said complex is Dibutyltindilaurate (DBTL) or 2-Ethylhexanoic acid, zinc salt, basic, in an even further preferred embodiment, said complex is 2-Ethylhexanoic acid, zinc salt, basic. Complexes of tin and zinc, in particular DBTL and 2-Ethylhexanoic acid, zinc salt, basic, are very effective to catalyse isocyanate reactions, the latter having the advantage of being less toxic and is thus preferred when the resulting coating is in contact with tap water.

According to another preferred embodiment, said catalyst is combined with said OH-functional silicone modified polyacrylate. It has surprisingly been found, that such combination provides an outstanding repellent surface. The repellent properties were demonstrated by a permanent marker test, but it is expected, that such surface is as well advantageous in repelling limescale. Even though the repellent effect in general is the expected effect of the OH-functional silicone modified polyacrylate, it is surprising, that only the combination of the OH-functional silicone modified polyacrylate with a suitable catalyst leads to outstanding repellence. The absence of the catalyst or the application of another coating additive, which is also OH-functional, which also comprises polydimethylsiloxane, and which according to the European Coatings Journal November/2006, p. 76, is suitable for anti-graffiti coatings, but is not a silicone modified polyacrylate, does lead to minor results.

According to another embodiment, the coating composition is applied to form a coating film on a heat-releasing surface, said surface, when in use, being regularly in contact with water, being used at temperatures above 0° C. and below +130° C. and being regularly subjected to a temperature gradient, said temperature gradient leading to a temperature difference of at least 20° C. and being either temporal with at least 0.1° C./min or local with at least 0.05° C./mm or a combination of both. A heat releasing surface is a warm surface that transfers heat to a colder fluid. The conditions as described, both a lateral temperature gradient through the coating, repeated and sudden temperature changes and permanent immersion in water are typically present in heat exchangers used to provide warm tap water. A coating applied to reduce limescale should withstand above conditions for several years. The present invention is expected to be stable over a life span of several years within said temperature gradients of 0.1° C./min and/or 0.05° C./mm. When tested over a longer period, but shorter as the expected life span, such as, for example, over 6 month, a coating should withstand significantly stronger temperature gradients. Surprisingly, the coating composition according to the present invention is stable towards the described temperature gradients. In a preferred embodiment, the coating is especially advantageous in an environment with a lateral temperature gradient of at least 0.2° C./mm and/or a temporal temperature gradient of at least 0.4° C./min.

According to another embodiment, the coating composition is applied to form a coating film on a heat releasing surface used to warm water, in particular tap water. Surprisingly, it was found that a coating prepared form the coating composition is especially suitable for this application due to its effectivity against limescale and its durability under typical conditions involving immersion in water, lateral temperature gradients and repeated and sudden temperature changes. Due to the temperature gradient resistance, the coating is, in a preferred embodiment, used on a plate heat exchanger, in a further preferred embodiment on a small plate heat exchanger having a distance between inlet and outlet below 800 mm. In an even further preferred embodiment, said distance is below 250 mm.

According to another embodiment, said coating composition is applied to form a coating on metal surfaces, such as copper and copper alloys, in particular brass, aluminium or aluminium alloys, iron or iron alloys, such as steel, in particular stainless steel or nickel or nickel alloys. Due to good protection against salt water, said coating is in a preferred embodiment used in contact with salt water. Due to the effective bonds between silanes and aluminium, said coating is in another preferred embodiment applied to aluminium or aluminium alloys.

In the following, the invention is described in more details by particular embodiments and examples. The provided quantities illustrate the relations of the reactants, not the actual batch sizes. All coating thicknesses were measured on at least three spots per sample with a Bykotest 7500 by Byk-Gardener. Examples 1, 3, 4 and are inventive with respect to claim 1, but comparative examples with respect to the preferred embodiments of claims 2, 3 and 4. Example 2 is inventive with respect to claims 1, 2 and 3, but comparative with respect to the preferred embodiment claimed by claim 4. Example 5 is inventive with respect to all claims. Example 7 is solely a comparative example with respect to claims 1, 5, and 6.

Used Substances:

Borchi Kat 22: From OMG, 2-Ethylhexanoic acid, zinc salt, basic, CAS No. [85203-81-2]

Byk Silclean 3700: from Byk, OH-functional silicone modified polyacrylate, 25% solution in 2-Methoxy-1-methylethyl acetate, OH equivalent weight, based on solids, ~1870 g/mol.

Desmodur BL 4265 SN: From Bayer Materialscience. Blocked aliphatic polyisocyanate, 65% solution in solvent-naphtha 100, blocked NCO equivalent weight: 519, (according to DE 10152853 A1, the blocking agent is butanonoxime.)

(3-Glycidyloxypropyl)trimethoxysilane, CAS No. [2530-83-8]

TEGO Protect 5000: From Evonik. Solvent-free hydroxyalkyl polydimethylsiloxane, i.e. a polydimethylsiloxane chain with two terminal hydroxyalkyl functions. The OH equivalent weight is ~1170 g/mol.

Resin Solution 1:

3.361 g (14.2 mmol) (3-Glycidyloxypropyl)trimethoxysilane are placed in a bottle. 0.307 g of a 0.1 N hydrochloric acid (containing 17.0 mmol water) are added. The mixture is stirred for 16 h at 18-22° C. Subsequently, 2,441 g Desmodur BL 4265 SN (4.70 mmol blocked NCO) and 9.675 g Butylacetate are added. The mixture is stirred until all components are dissolved resulting 15.784 g clear solution.

Example 1-6 are prepared by mixing the respective components according to table 1. In all cases, clear solutions are obtained.

TABLE 1

Composition of examples 1-6

| | Resin solution 1 | Borchi Kat 22 | Byk Silclean 3700 | Tego Protect 5000 |
|---|---|---|---|---|
| Example 1 | 15.784 g | — | — | — |
| Example 2 | 15.784 g | — | 0.118 | — |
| Example 3 | 15.784 g | — | — | 0.030 g |
| Example 4 | 15.784 g | 0.026 g | — | — |
| Example 5 | 15.784 g | 0.026 g | 0.118 | — |
| Example 6 | 15.784 g | 0.026 g | — | 0.030 g |

TABLE 2

Composition of example 5

| Component | Mass | Theoretical solids after curing | |
|---|---|---|---|
| | | Absolute | Relative |
| (3-Glycidyloxypropyl)trimethoxysilane | 3.361 g | 2.386 g (full hydrolysis and condensation) | 65.9% |
| 0.1N Hydrochloric acid | 0.307 g | 0 g | 0.0% |
| Desmodur BL 4265 SN | 2.441 g | 1.177 g (removal of solvent and butanone oxime blocking agent) | 32.5% |
| Butylacetate | 9.675 g | 0 g | 0.0% |
| Borchi Kat 22 | 0.026 g | 0.026 g | 0.7% |
| Byk Silclean 3700 | 0.118 g | 0.030 g (removal of solvent) | 0.8% |
| Sum | 15.928 g | 3.619 g | 99.9% |

EXAMPLE 7

1 g of the coating according to WO 2012083970 A1, hydrolysed coating compositions, example 1, was diluted with 0.28 g Ethanol and 0.28 g 4-Methyl-2-butanone.

Heat Exchanger Calcification Test

A test was performed simulating the calcification of heat exchangers that provide warm water in buildings connected to district heating. For the test, plate heat exchangers consisting of 10 AISI 316 steel plates, size 208×77 mm, with a stamped fishbone pattern were used. The plates are copper-brazed to form a plate pack with 2 mm spacing between the plates, forming two chambers of alternating spaces, one for the heat supply, and one for the tap water to be warmed up. On top are connectors for the in- and outlet of each fluid. The lateral distance between inlet and outlet is 160 mm. The heat exchanger is shown in FIG. 1.

Three heat exchangers were tested: Heat exchanger A without coating, heat exchanger B with the coating according to example 5 and heat exchanger C with the coating according to example 7. Solely the chamber for the cold water to be heated was coated, i.e. the side of the heat exchanger providing the hot tap water.

The heat exchangers were cleaned with a 5% solution of a mild alkaline cleaner (Eskaphor AE 6044, Haug Chemie, pH~9) for 30 mm at 65° C., rinsed 5 times with demineralised water, dried 1 h at 105° C. and let to cool below 30° C. The respective coating systems were applied. For both cleaning, rinsing and coating application, one chamber was filled with the respective liquid and closed with rubber plugs. The heat exchanger was tumbled in all directions to ensure contact with the whole surface. After coating application, the heat exchangers were stored with the plates in vertical direction for 40 min. Excess coating material collecting at the bottom was removed with a cannula and a syringe. The coatings were cured for 1 h at 185° C. (example 5) or 200° C. (example 7), respectively. Inlet and outlet area were inspected and found to be free of coating defects. While the coating thickness on the heat exchangers could not be measured, a similar application by dip coating on flat aluminium plates leads to a thickness of 2-4 μm for both of the coatings of examples 5 and 7.

The heat exchangers were evaluated by a scaling test over 6 months. The test runs with alternating 15 mm of a flow in both chambers and 45 mm without flow in both chambers. The flow is set up as a counter flow. Cold tap water and heating medium enter at opposite ends of the heat exchanger. At the heating medium chamber, warm water enters at 85° C. and leaves at about 35° C. At the tap water chamber, the water enters at about 10° C. and leaves at about 60° C. The flow on the tap water side was set to 2 L/min for the first 3 months and to 4 L/min for the following 3 months. The flow on the heating media side was adjusted to reach a temperature of 60° C. for the outgoing tap water. The hardness of the cold tap water was 18-30 dH. All heat exchangers were tested in parallel at the same time and were thus purged with identical water quality. During the cycle without flow, an even temperature close to 20° C. develops over the whole heat exchanger. When the cycle with flow through both chambers starts again, within 10 s, the temperature profile with outgoing temperatures of the heating media of 35° C. and of the tap water of 60° C. establishes again.

Figure 2:
FIGS. 2 to 4 show the outlet of the respective heat exchangers after the scaling test.
Figure 3:
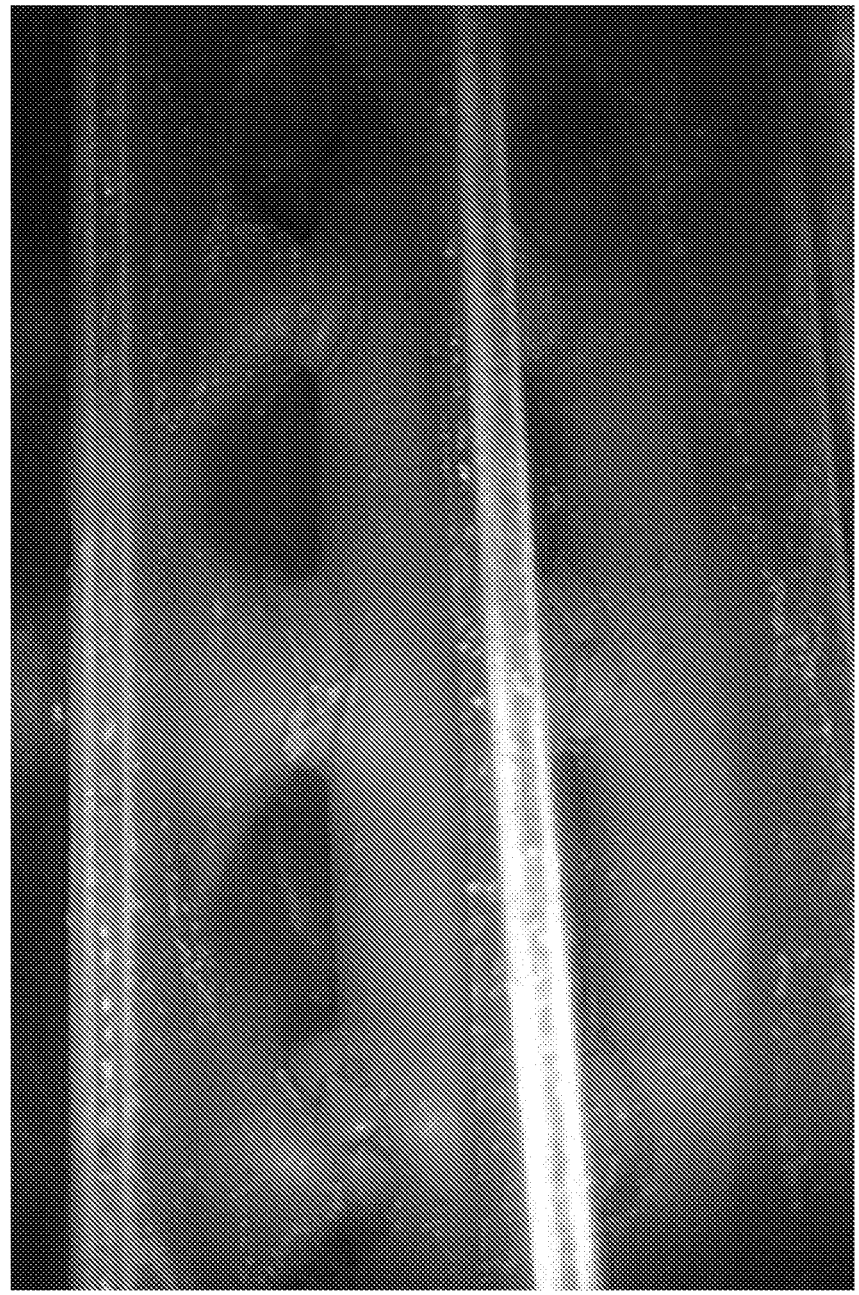
Figure 4:

After 6 months, the test was stopped. Inlet and outlet area of the chambers leading the tap water to be warmed were investigated with a fibre camera. Heat exchanger A was covered by a continuous layer of limestone. Furthermore, several particles with a size up to 0.5 mm block the flow. This is illustrated by FIG. 2 showing the outlet area. In heat exchanger B, there are no bigger particles visible. Besides single small spots with a maximum size of 50 μm, the biggest part of the surface is free of limestone. This is illustrated by FIG. 3 showing the outlet area of the respective heat exchanger. In heat exchanger C, the coating has, at least partly, fallen off. Loose coating stripes block the flow of the heat exchangers. Besides these coating stripes, more limestone particles cover the surface compared to heat exchanger B. However, it is not obvious, whether there is still coating on this area or not. The outlet area of this heat exchanger is shown in FIG. 4.

The test showed that heat exchanger B effectively reduced limestone scaling. Surprisingly, the coating according to example 5 withstands both the lateral temperature gradient between inlet and outlet and the temporal temperature gradient when switching between the different cycles. The temperature gradients through the coating were not measured. However, the lateral gradient of the coating must be between the gradients of the warm (heating media) and of the cold (tap water) side. In this test, gradients of warm- and cold water side were about identical. The distance between inlet and outlet is 160 mm Thus, the lateral temperature gradient is about (60° C.−10° C.)/160 mm≅0.31° C./mm. For the temporal gradient when switching on the flow, the initial temperature is 20° C. After 10 s, for the coating at the outlet of the tap water side, a temperature between 60° C. (outlet tap water) and 8° C. (inlet heating media) is reached. Thus, the temporal gradient is a value between (60° C.−20° C.)/10 s≅4° C./s and (85° C.−20° C.)/10 s≅6.5° C./mm. The coating according to example 7, despite being a polysiloxane coating, and despite providing, according to WO 2012083970 A1, good wet adhesion to stainless steel, does not withstand the lateral and temporal temperature gradients of the performed scaling test.

Corrosion Test on Aluminium

The performance of the coatings according to examples 4 and 5 to protect corrosion on Aluminium was investigated. Aluminium panels, alloy 3003H14, bare mill finish, size 89×51×0.64 mm from Q-lab were cleaned by 30 mm immersion in a mild alkaline cleaner (10% solution of Tickopur R33 from Dr. H. Stamm, pH~10) at 20° C., rinsing 3 times with demineralised water, oven drying for 15 mm at 90° C. and letting cool down to room temperature. The coatings according to examples 4 and 5 were applied to one side of the aluminium plates by spray-coating by hand under identical conditions and in an as equal speed as possible. The substrate wetting of both coatings is good; there are no wetting defects. After 3 mm flash-off at room temperature, the samples were cured for 40 mm at 185° C. There was no loss of coating material due to running to the edges on flash-off. For both coatings, after curing, clear and smooth coating films are obtained. Due to practically identical solid content, viscosity and application technique, there is practically no difference in the obtained film thickness of the coatings according to example 4 and 5.

Film thickness has also been measured. However, the precision of this measurement is below 1 μm, so these measurements are of limited significance. All samples clearly showed a coating film without any holes, also those sample measured with thickness "0.1 μm".

The samples were investigated by bare eye and by stereomicroscope with 63-fold magnification. Some of the coated plates of both coatings showed a wetting defect due to a dirt particle. In this case, the area was marked and the bigger area within 6 mm distance from the whole levelling defect area was not taken into account for the following corrosion test.

The samples were immersed in a 5% aqueous NaCl-solution at 90° C. for 41 h. None of the sample showed any signs of creeping corrosion. The samples were visually inspected with the bare eye and with a stereomicroscope with 63-fold magnification to identify localised corrosion spots by corrosion pits visibly surrounded by corrosion products. The results are shown in table 3.

TABLE 3

Results of the corrosion test for coated aluminium samples.

| Coating | Measured coating thickness, 3 spots per plate, error +/− 1 μm | No. of localised corrosion spots after 41 h immersion in 5% $NaCl_{aq}$ at 90° C. |
|---|---|---|
| Example 4 | 0.6-0.7 μm | 2 |
| Example 4 | 0.7-1.3 μm | 1 |
| Example 4 | 1.0-2.0 μm | 1 |
| Example 4 | 1.3-1.5 μm | 2 |
| Example 5 | 0.1-0.6 μm | 0 |
| Example 5 | 0.6-1.9 μm | 0 |
| Example 5 | 0.8-1.1 μm | 0 |
| Example 5 | 1.0-1.6 μm | 0 |

The results show a significant difference between the two coatings. While there are 1-2 corrosion spots on all 4 samples coated with the coating according to example 4, the samples coated with the coating according to example 5 surprisingly show no signs of corrosion.

Contact Angle Measurement

Contact angles were determined with a DSA 10 goniometer by Krüss. Static contact angle were measured by placing a 10 μl drop on the surface, removing the syringe. Advancing and receding contact angles were determined with the syringe inside the drop. When water is continuously added to a drop on a surface, the drop volume growth until the drop reaches a certain maximum contact angle just before the interface between drop and coating surface expands as well. This is the advancing contact angle. Vice versa, the receding contact angle is the minimal contact angle of a shrinking drop, where water is removed through the syringe, just before the interface between drop and coating surface contracts.

Coated aluminium samples were prepared in the same way as described above for the for the corrosion test. Water contact angle results are based on ten measurements from two different plates of each coating according to example 4 and 5, respectively. Coating according to example 4: Static: 68.6±3.9°, Advancing: 70.4±1.1°, Receding: 44.2±2.3°, Coating according to example 5: Static: 101.3±1.0°, Advancing: 100.0±2.4°, Receding: 84.0±4.5°.

Marker Test

The repellent properties were investigated by a permanent marker test. An about 3 cm long line was drawn with a black Stabilo OHPen size M marker. The repellent properties in this test are checked by three parameters. The first check is, whether there was a beading effect, i.e. the repellent surface inhibits wetting by the marker ink. After 2 mm drying, it was tried to wipe the marker line away with a dry paper tissue by hand. The second check is, whether this is possible. If it was possible to wipe the marker away, the third check is, whether a visible grey or black trace was left after removing the marker, indicating the marker ink to have penetrated into the coating. Optimal repellence should inhibit marker ink to penetrate the coating. For this test, coated Aluminium samples were prepared with the respective coating compositions the same way as described above for the corrosion test. All prepared coating films were completely clear. The results are shown in table 4. The results are also illustrated by FIG. 5. However, the slight grey traces might not be properly visible in FIG. 5.

The results of the marker test clearly show that the coating of example 5, containing both the catalyst and the OH-functional polydimethylsiloxane modified polyacrylate additive is superior in the marker test as there are no traces of the marker after wiping.

TABLE 4

Results of the marker test

| Coating according to: | Beading effect | Wiping away possible | Trace left after wiping away |
|---|---|---|---|
| Example 1 | no | no | — |
| Example 2 | yes | yes | yes[1] |
| Example 3 | partly | yes | yes[1] |
| Example 4 | no | no | — |
| Example 5 | yes | yes | no |
| Example 6 | partly | yes | yes[1] |

[1]The intensity of the grey trace left is in the order example 3 > example 6 ≈ example 2.

The invention claimed is:

1. A heat-releasing surface comprising a curable coating thereon, wherein the heat-releasing surface is disposed in a heat exchanger, said coating being prepared from a curable coating composition comprising, based on solids after curing, 35-80% by weight of an epoxysilane according to the general structure 1 and/or its hydrolysation and/or condensation products, $$R^1R^2_aSiR^3_b$$      1:

with $R^1$ being 3-glycidyloxypropyl, $R^2$ being methyl, $R^3$ being alkyloxy or acyloxy, a being 0, 1or 2, and b being 3−a and 20-65% by weight of a blocked polyisocyanate and optionally further components.

2. The heat-releasing surface according to claim 1, wherein the heat-releasing surface is a metal surface, selected from copper, copper alloys, brass, aluminium alloys, iron, iron alloys, steel, stainless steel, nickel, nickel alloys, or combinations thereof.

3. The heat-releasing surface according to claim 1, wherein the surface is disposed in plate heat exchanger surfaces.

4. The heat-releasing surface according to claim 3, wherein the surface is disposed in brazed plate heat exchangers.

5. The heat-releasing surface according to claim 1, wherein the curable coating composition further comprises, based on solids after curing, 0.1 to 4% by weight of an OH-functional silicone modified polyacrylate, said silicone used to modify the polyacrylate being polydimethylsiloxane, said OH-function leading to an OH-equivalent weight of said polyacrylate of 500-5000 g/mol.

6. The heat-releasing surface according to claim 1, wherein the curable coating composition, when cured to form a coating film, provides a coating film that initially provides a receding water contact angle of at least 70°.

7. The heat-releasing surface according to claim 1, further comprising, based on solids after curing, 0.1 to 4% by weight of a metal complex comprising at least two ligands of the group of carboxylic acids and 1.3-dicarbonyl compounds.

* * * * *